Sept. 30, 1969 G. R. KOLNOWSKI 3,470,482

VIDEO PULSE SAMPLE AND HOLD CIRCUITRY

Filed May 31, 1967 2 Sheets-Sheet 1

WITNESSES
Theodore F. Wrobel
James F. Young

INVENTOR
Gene R. Kolnowski
BY
ATTORNEY

Sept. 30, 1969 G. R. KOLNOWSKI 3,470,482

VIDEO PULSE SAMPLE AND HOLD CIRCUITRY

Filed May 31, 1967 2 Sheets-Sheet 2

3,470,482
Patented Sept. 30, 1969

3,470,482

VIDEO PULSE SAMPLE AND HOLD CIRCUITRY

Gene R. Kolnowski, Baltimore, Md., assignor to Westinghouse Electric Corporation, Pittsburgh, Pa., a corporation of Pennsylvania Filed May 31, 1967, Ser. No. 642,474
Int. Cl. H03d *1/18*
U.S. Cl. 329—102 10 Claims

ABSTRACT OF THE DISCLOSURE

The present disclosure relates to video pulse sampling and storing or demodulating circuitry wherein a video pulse is stretched in time and then its amplitude level is sampled in response to the video pulse after the video pulse has reached its peak amplitude. A bilateral switch is provided to effect the rapid change of the stored level of a holding circuit permitting the amplitude level of the next video pulse to be stored therein.

Background of the invention

The present invention relates to pulse responsive circuitry and, more particularly, to pulse sampling and storing or demodulating circuitry.

In certain system applications, such as tracking or pulse amplitude demodulation systems, it is necessary that pulse responsive circuitry be provided so that analog input pulses, for example, video pulses, can be sensed and the amplitude level of each pulse held until the occurrence of the next pulse. Such circuitry may also be required in systems where the video pulse duration is of a shorter time interval than the minimum allowable sampling pulse width of the system. Also, when a train of pulses is to be sensed, it may be required that the amplitude of the last pulse of the train be held until the next pulse train arrives. In these applications, however, it is necessary that the response of the circuitry be fast enough to respond to the amplitude of each of the input pulses to insure proper demodulation while still being capable of storing the amplitude of the last pulse of the train for the period of time between pulse trains. Past pulse amplitude sensing techniques have typically employed conventional diode detectors which have the serious disadvantage of being unable to follow rapid variations in the video pulse amplitude level, especially decreasing amplitude levels, if the detector is to be capable of maintaining amplitude levels when the interval between pulse trains is substantially longer than the interval between individual pulses of the train.

To insure proper demodulation of pulse amplitude modulation input video pulses, it is normally required that some form of synchronization with respect to the timing of the video pulses be provided. This is necessary in order to insure that the samples of the video pulses be taken at the desired peak amplitude levels thereof. If the pulse amplitude is sampled at other than its peak amplitude spurious results will of course be obtained. In systems where the position of the input pulse may randomly occur in time, it becomes quite difficult to provide external synchronization to demodulate the pulse train. Moreover, if it were possible to provide external synchronization, it becomes necessary that the circuit channel for the analog video pulses have a very wide bandwidth in order to sample the narrow video pulses and provide rapid response to changes in the video amplitude.

Summary of the invention

It is therefore an object of the present invention to provide new and improved pulse sampling and storing or demodulating circuitry.

It is a further object to provide new and improved pulse sampling and storing or demodulating circuitry which is self-synchronizing.

It is a further object to provide pulse sampling and storing or demodulating circuitry which is responsive to the amplitude level of each pulse as received and still maintains the stored level for desired extended periods of time.

Broadly, the present invention provides new and improved pulse sampling and storing or demodulating circuitry wherein an input pulse is stretched in time and sampled after reaching peak amplitude in response to the input pulse. A bilateral switching action is provided to permit the rapid change of stored level of the circuitry in response to the sampling operation while still maintaining the stored level between the reception of input pulses.

Description of the preferred embodiment

Figure 1:
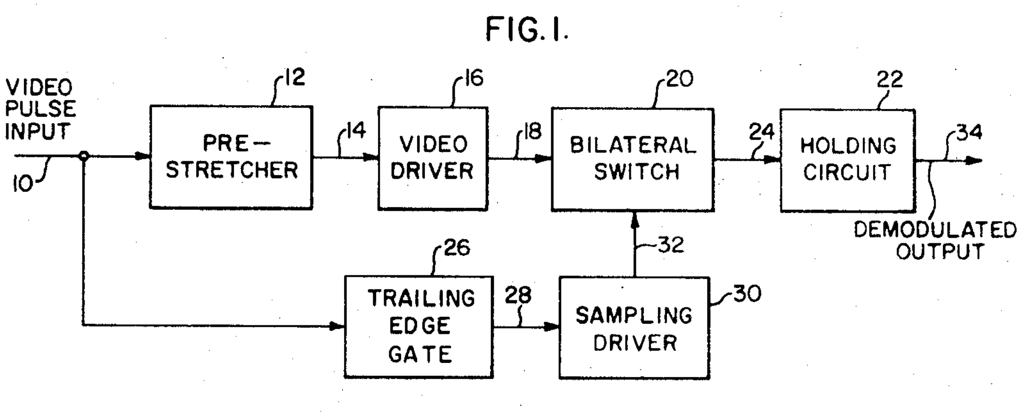
FIGURE 1 is a functional block diagram of the present invention.

Referring now to FIG. 1, the video pulse input is applied via an input 10 to a pre-stretcher circuit 12. The video input pulses appearing at the input 10 may have the waveform as shown in curve A of FIG. 3. As can be seen in curve A of FIG. 3, the video pulses have varying amplitude levels, and it also should be noted that the video pulses may have varying time periods therebetween provided the minimum time period is greater than approximately 4 times the time-constant of the pre-stretcher. Pre-stretcher 12 stretches the time duration of the video pulses to supply an output at the lead 14, which is shown in the waveform diagram of curve B of FIG. 3. The time extended output of the pre-stretcher 12 is applied to a video driver 16 for current amplification with the amplified and stretched video signal appearing at the output 18 of the video driver 16. The waveform of the signal appearing at the lead 18 is substantially the same as that appearing at curve B of FIG. 3. A bilateral switch 20 is connected between the video driver 16 and a holding circuit 22 with a connection 24 being provided between the holding circuit 22 and the bilateral switch 20. The switch 20 is of a bilateral type and when activated provides a low impedance path therethrough in either direction. That is, when the switch 20 is in a closed state a signal may be translated from the lead 18 to the lead 24 or, vice versa, from the lead 24 to the lead 18 depending upon the potential difference existing between the video driver 16 and the holding circuit 22.

Figure 3:
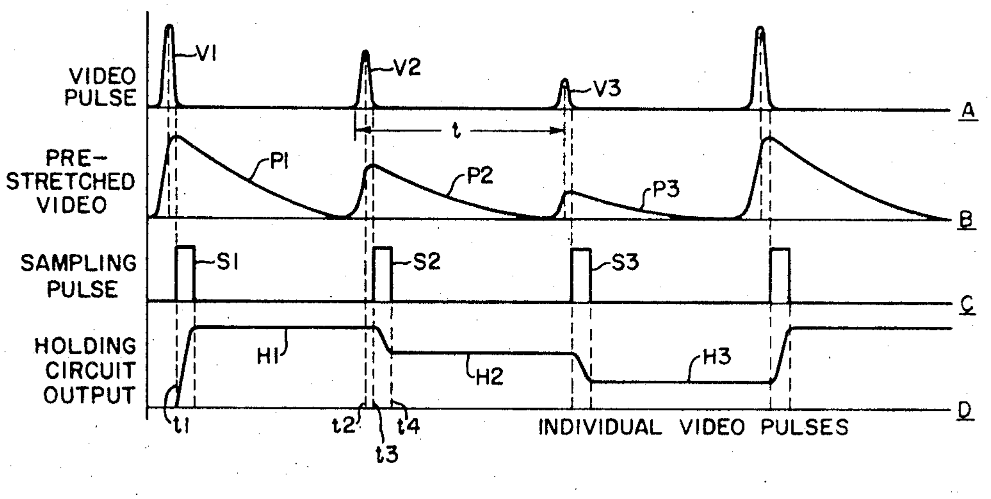
FIGS. 3, 4 and 5 are waveform diagrams used in the explanation of the operation of the present invention.

The video pulses appearing on the input 10 are also applied to a trailing edge gate 26. The trailing edge gate 26 senses the trailing edge of each of the video pulses and in response thereto generates a sampling pulse at its output 28. As can be seen in FIG. 3, at a time *t*1, a video pulse V1 (curve A) has substantially terminated, that is, its trailing edge is being presented at the input to the pre-stretcher 12 and the trailing edge gate 26. At this time the trailing edge gate 26 is responsive to provide a sampling pulse S1 (curve C) at its output 28. The output of the pre-stretcher is shown as a pulse P1 in curve B of FIG. 3. At the time *t*1, thus, a sampling pulse S1 is generated and supplied to a sampling driver 30. In response to a sampling pulse applied to the sampling driver 30, an output is provided therefrom from an output 32 to the bilateral switch 20. The signal at the output 32 to the bilateral switch 20 is of such an amplitude duration to actiavte the bilateral switch 20 and provide a bilateral path therethrough. The output of the video driver 16, which will be the pulse P1 at the time *t*1, will thus be translated therethrough to the holding circuit 22 with the holding circuit 22 acquiring an output level H1 (equal to the pulse P1 at the termination of the sampling pulse) (curve D of FIG. 3) in response thereto at an output 34. The holding circuit 34 will hold the output level until the time at which a second video pulse is applied at the input 10 of FIG. 1.

A second pulse V2 is applied at the lead 10 at the time *t*2 as shown in curve A of FIG. 3. At a time *t*3 when the trailing edge of the pulse V2 appears at the trailing edge gate 26, a second sampling pulse S2 (curve C) is supplied therefrom to the sampling driver 30 with the output thereof via the lead 32 switching on the bilateral switch 20. At the time *t*3, the amplitude of the stretched pulse P2 (curve B) is sampled. Since the amplitude level of the video pulse V2 is less than that of the pulse V1, charge will be transferred from the holding circuit 22 via the lead 24 through the bilateral switch 20 to the lead 18 and the video driver 16. The holding circuit 22 will revert to a lower charge level H2, as shown in curve D of FIG. 3, which is substantially the same amplitude level as the peak amplitude of the pulse V2. This amplitude level will then be maintained until the next video pulse V3 (curve A) is applied to the lead 10. The operation will thus repeat itself with a sampling pulse S3 being generated and the holding circuit 22 going to the level H3 as shown in curve D of FIG. 3 with the operation continuing for the remaining video pulses as supplied to the apparatus in FIG. 1.

Figure 2:
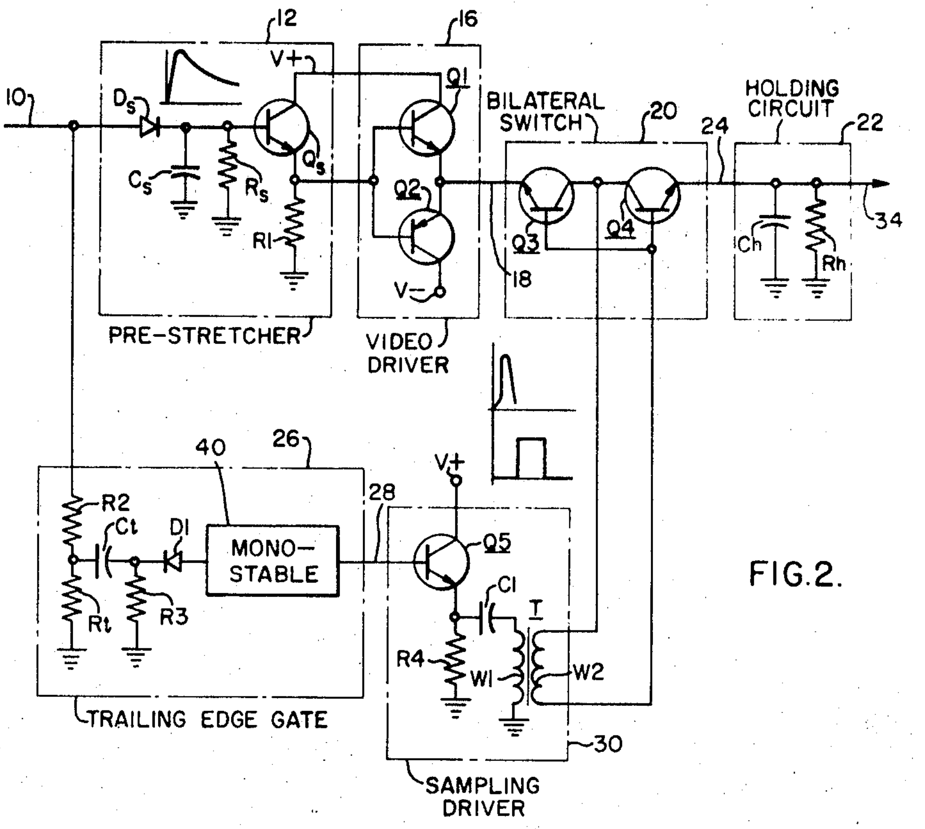
FIG. 2 is a schematic diagram of the circuitry of the present invention.

In FIG. 2 a schematic diagram of circuitry for providing the functions as just described with reference to FIG. 1 is shown. The video signal via a lead 10 is applied to the pre-stretcher 12 which includes a diode peak detector. The diode peak detector includes a diode D*s*, with its anode electrode connected to the lead 10, and a capacitor C*s* and a resistor R*s* connected in parallel between the cathode of the diode D*s* and ground. In response to video pulses, the capacitor C*s* charges via the diode D*s* to the peak value of the video pulse. The time constant of the diode detector C*s*R*s* is selected so that the charge deposited on the capacitor C*s*, in response to a video pulse, completely decays by the time the next video pulse normally occurs. Thus, the time constant for the resistor R*s* and capacitor C*s* is selected to be substantially less than the time period between the video pulses such as shown in curve A of FIG. 3.

The voltage appearing on the capacitor C*s* is applied to the base of a transistor Q*s* which is of the NPN type. The transistor Q*s* is connected as an emitter follower with an emitter resistor R1 connected between the emitter electrode thereof and ground. The collector of the transistor Q*s* is connected to a source of positive polarity operating voltage V+, not shown. The transistor Q*s* being connected in the emitter follower mode thus presents a high shunt impedance to the discharge path of the capacitor C*s* and a low impedance to the charging path of the holding circuit 22. The output of the pre-stretcher is taken at the emitter of the transistor Q*s* at the lead 14 and has a waveform as shown in curve B of FIG. 3. Thus, in response to the video pulse V1, shown in curve A of FIG. 3, a pre-stretched video pulse P1, curve B, is provided, with the shape of curve P1 after the time period at which the peak of video pulse V1 occurs being essentially that of the discharge of the capacitor C*s* through the resistor R*s*. It can be seen in curve B of FIG. 3 that the capacitor C*s* has completely discharged by the time *t*2 when the next video pulse V2 appears.

The output of the pre-stretcher 12 is taken at the emitter electrode of the transistor Q*s* and applied via the lead 14 to the base electrodes of a pair of transistors Q1 and Q2 of the video driver 16. The transistors Q1 and Q2 are of complementary conductivity types, with the transistor Q1 being of the NPN type and the transistor Q2 being of the PNP type. The collector of the transistor Q1 is connected to the V+ source, while the collector of the transistor Q2 is connected to a source of negative polarity potential V−, not shown. The emitter electrodes of the transistors Q1 and Q2 are commonly connected to provide the output of the video driver 16 therefrom at the lead 18 to the bilateral switch 20.

The bilateral switch 20 includes a pair of transistors Q3 and Q4. Both of these transistors are shown to be of the NPN conductivity type and have their base electrodes and their collector electrodes respectively connected. The emitter electrode of the transistor Q3 is connected to the lead 18 at the emitters of the transistors Q1 and Q2 of video driver 16, and the emitter of the transistor Q4 is connected to the lead 24 which is the input to the holding circuit 22. The holding circuit 22 includes the parallel connection of a capacitor C*h* and a resistor R*h* connected between the emitter electrode of the transistor Q4 and ground. The demodulated output of the holding circuit is taken from the lead 34 at the ungrounded end of the capacitor C*h* and resistor R*h*.

The sampling operation of the circuitry of FIG. 2 will now be considered. Video signals appearing at the input lead 10 are also applied to the trailing edge gate 26. The trailing edge gate 26 includes a resistor R2 connected between the lead 10 and one end of a capacitor C*t*. A resistor R*t* is connected between the junction of the resistor R2 and the capacitor C*t* to ground. The other end of the capacitor C*t* is coupled to a monostable multivibrator 40 via a diode D1. The cathode of the diode D1 is connected to the capacitor C*t*, and a resistor R3 is connected between the cathode-capacitor connection and ground.

In response to a video pulse being applied to the trailing edge gate, for example, the pulse V1 of curve A of FIG. 3, the capacitor C*t* charges to the polarity as shown in FIG. 3 as the video pulse increases from its zero level to its peak amplitude level. After the video pulse has reached its peak amplitude level the capacitor C*t* will begin to discharge as the video pulse returns to zero level along its trailing edge. The time constant of the circuit including the capacitor C*t* and the resistors R*t* and R3 is so selected to be somewhat greater than the video pulse duration. Thus, a negative voltage will appear at the end of the capacitor connected to the cathode of the diode D1, which will cause the diode D1 to be forward biased and therefore conductive from anode to cathode. The conduction of the diode D1 triggers the monostable multivibrator 40 which provides a pulse output at the output lead 28. This pulse output is a sampling pulse as discussed above and shown in curve C of FIG. 3.

As can be better seen in FIG. 3, the sampling pulse S1 is generated at the time *t*1 which is at the trailing edge of the video pulse V1. The sampling pulse S1 lasts for a predetermined time period as set by the time constant of the monostable 40, the pulse being terminated when the monostable returns to its normal state. As can be seen from FIG. 3 the video pulse V1 at the time *t*1 has already reached peak magnitude and is on its trailing edge. Curve B of FIG. 3 shows that the pre-stretched video pulse P1 at the time *t*1 is substantially at the peak amplitude level of the video pulse V1. Hence, the amplitude level appearing at the input 18 to the bilateral switch 20 at this time is essentially the peak amplitude of the input video pulse. The delayed triggering of the monostable multivibrator 40 on the trailing edge of the video pulse is necessary to insure that the video pulse has reached peak amplitude before the switch 20 is turned on and thus insure that the holding circuit 22 will charge to the peak amplitude of the then applied video input pulse.

The sampling pulse S1 is applied to the sampling driver 30 via the base electrode of a transistor Q5. Transistor Q5 is connected in an emitter follower mode, with the collector electrode connected to the V+ source and the emitter coupled to ground via a resistor R4. Application of the sampling pulse to the base electrode of transistor Q5 causes an output pulse to be supplied via the blocking capacitor C1 to the primary winding W1 of a pulse transformer T. One end of the secondary winding W2 of the transformer T is connected to the collector electrodes of the switch transistors Q3 and Q4, and the other end of the winding W2 is connected to the base electrodes of the transistors Q3 and Q4. The floating connection of the secondary winding W2 provides electrical isolation between the video pulse channel and the sampling pulse channel of the circuitry.

The amplitude of the pulses applied to the switch transistors Q3 and Q4 from the driver transistor Q5 via the transformer T are selected to be of such an amplitude to supply sufficient current to the transistors to drive both of them into full saturation. When both the transistors Q3 and Q4 are fully saturated, current may be translated therethrough in both directions, that is, from collector to emitter as well as from emitter to collector.

Assuming initially that the capacitor C*h* of the holding circuit 22 is uncharged and that at time *t*1 the bilateral switch 20 is turned on, the capacitor C*h* will charge to the level H1 as shown in curve D of FIG. 3, charging current being supplied thereto from the video driver 16 through the transistor Q1 thereof, the emitter-collector circuit of the transistor Q3 and the collector-emitter circuit of the transistor Q4. Since the impedance appearing between the emitters of the transistors Q3 and Q4 of the bilateral switch 20 is very low in that both of these transistors are in saturation, the capacitor C*h* may charge to the value H1 in a relatively short period of time. The value H1 corresponds substantially to the peak amplitude of the video pulse V1 which has been stretched as the pulse P1 (curve B) and sampled at the time *t*1. As can be seen by curve D of FIG. 3, the holding circuit 22 has charged to the value H1 by the end of the sampling pulse S1. At this time the switch 20 is rendered nonconductive and the charge appearing on the capacitor C*h* at this time will be held with only a high impedance discharge path being provided through the resistor R*h*. The time constant for the capacitor C*h* and resistor R*h* is selected so that it is large compared to the usual time intervals between video pulses; thus, the level H1 appearing on the capacitor C*h* will remain thereon substantially unattenuated until the next video pulse V2 is applied to the input of the circuit at the lead 10.

The pulse V2 appears at the time *t*2 at the input 10 and is stretched in the pre-stretcher 12 to appear as the pre-stretched video pulse P2, shown in curve B of FIG. 3. The stretched pulse P2 is then applied from the emitter of the transistor Q*s* to the video driver 16. At the trailing edge of the video pulse V2, at the time *t*3, the monostable multivibrator 40 is triggered to supply a sampling pulse S2 to the sampling driver 30, which via the transistor Q5 and transformer T supplies a turn on pulse to the switch transistors Q3 and Q4 which are saturated in response thereto. Since the peak amplitude of the video pulse V2 is less than that of the video pulse V1, the charge level of the holding circuit 22 must decrease, with the capacitor C*h* discharging to the amplitude level of the stretched video pulse P2. A discharge path is provided through the bilateral switch 20 from the capacitor C*h* to the emitter-collector circuit of the transistor Q4 and the collector-emitter circuit of the transistor Q3 to the driver transistor Q2, with a low impedance discharge path thus being provided therethrough. The capacitor C*h* discharges to an amplitude level H2 as shown in curve D of FIG. 3 corresponding to the approximate amplitude level of the video pulse V2 in a short time period as shown in FIG. 3, which is essentially the time period when the sampling pulse S2 terminates at the time *t*4.

The operation of the circuit continues for subsequent video pulses with the holding circuit capacitor C*h* charging to a higher voltage level if the succeeding video pulse is of a higher amplitude than that being stored, or, with the capacitor C*h* discharging to a lower amplitude voltage, if the next video pulse is of a lower amplitude than the stored video pulse. The charge and discharge of the capacitor C*h* may be accomplished in the short sampling interval in that the bilateral switch 20 is operated in a saturated mode and has a very low impedance charge and discharge path therefor. However, when the sampling pulse terminates and the switch is opened, the charge appearing on the capacitor C*h* is maintained for a relatively long period of time due to the high time constant of the circuit including the capacitor C*h* and the resistor R*h*.

It should be understood that the circuitry of FIG. 2 is self-synchronizing; in that, sampling pulses are generated in response to video and then only after the video pulse has reached its peak amplitude to insure that the peak amplitude is sampled.

Figure 4:
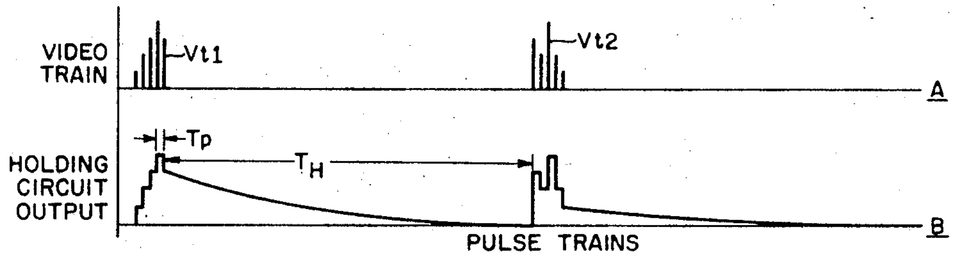

The sampling and holding operation of the circuitry of FIG. 2 is also illustarted in FIG. 4 wherein a video train input is utilized. In curve A of FIG. 4, a video train V*t*1 comprising five video pulses is applied at the input 10 of the circuit. The holding circuit 22 output appears at the lead 34 and is illustrated in curve B of FIG. 4. The normal time interval between the individual video pulses is designated at T*p*. During a small portion of the time T*p*, the sampling operation takes place in the holding circuit to charge or discharge via the low impedance bilateral switch 20 to the new amplitude level of the input video pulse. At the end of the last pulse of the train V*t*1, the holding circuit 22 then slowly discharges during the time period TH as illustrated in curve B of FIG. 4 and has completely discharged at the occurrence of the next video pulse train V*t*2, which also includes five video pulses. The output of the holding circuit 22 in response to the pulse train V*t*2 is illustrated in curve B of FIG. 4. It can therefore be seen that sampling and holding circuitry in FIG. 2 quickly responds to the amplitude level of the individual pulses of a video pulse train to acquire the amplitude level thereof whether the amplitude is increasing or decreasing and holds this level until the appearance of the next amplitude video pulse of the train. When however the pulse train terminates, the amplitude of the last pulse of the train is held for a relatively long period of time which may be necessary in the particular system being utilized. The time constant C*h*R*h* is selected to provide a relatively slow decay between pulse trains, but with the charge of capacitor C*h* substantially gone by the time the next train appears. To obtain applications, it may not be necessary that the charge completely decay before the next train occurs. The decay time can be increased by increasing C*h*R*h*.

Figure 5:
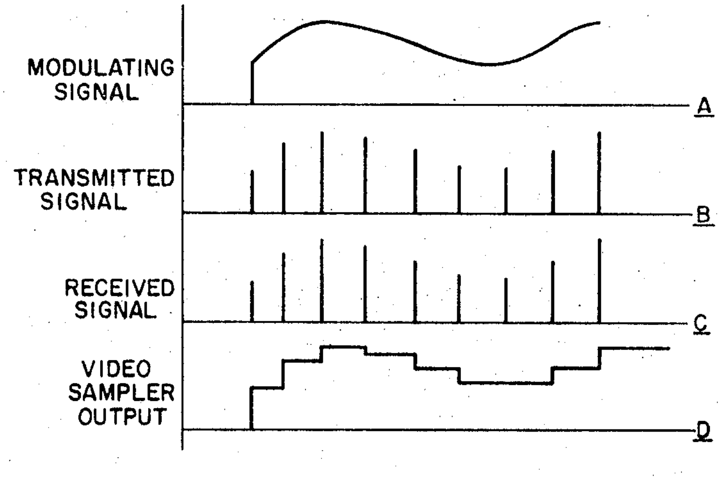

The circuitry as illustrated in FIGS. 1 and 2 may also be utilized in a demodulating mode wherein pulses modulated according to amplitude are applied to the input. This mode of opeartion is illustrated in FIG. 5 wherein curve A shows a modulating envelope, which is shown to be a sinusoidal waveform. The modulation appearing on curve A of FIG. 5 may be transmitted as a pulse amplitude modulated PAM signal as shown in curve B of FIG. 5. As can be seen in curve B of FIG. 5 individual pulses of the transmitted signal correspond to peak amplitude levels of the modulating signal at selected periods of time. Curve C of FIG. 5 illustrates the received pulse amplitude modulated signals which are applied via the lead 10 to the circuitry of FIG. 2. The demodulated output which appears at output 34 of the holding circuit 22 is shown in curve D of FIG. 5. As can be seen from curve D of FIG. 5, the circuit responds to the peak amplitude level of the received pulse signal and holds this amplitude level until the next pulse is received. In this manner the original modulating envelope, as shown in curve A of FIG. 5, is reconstructed, as can be seen by comparison of curves A and D.

It can, therefore, be seen that the combination of the present invention may be employed to demodulate pulse amplitude modulated signals, and, as perviously discussed, may be utilized to sample and store respectively the amplitude level of the individual pulses of a pulse train, and, moreover, may be used to hold the amplitude of the last pulse of a train for a relatively long period of time until a new pulse train is received.

Although the present invention has been described with a certain degree of particularity, it should be understood that the present disclosure has been made only by way of example and that numerous changes in the details of circuitry and the combination and arrangement of elements and components can be restored to without departing from the spirit and scope of the present invention.

I claim:

1. Pulse responsive circuitry receiving input pulses having varying amplitudes comprising:
   stretching means for stretching the time duration of each of said input pulses;
   sampling means for providing a sampling pulse in response to each of said input pulses after each of said input pulses reaches peak amplitude;
   holding means; and
   bilateral switching means operatively connected between said stretching means and said holding means and in response to each of said sampling pulses providing a bilateral conductive path therethrough,
   said holding means acquiring substantially the peak amplitude level of each of said input pulses to the conduction of said bilateral switching means and holding said level until the next of said input pulses is sampled.

2. The circuitry of claim 1 wherein:
   said stretching means including,
   a peak detector circuitry having a relatively long time constant as compared to the time duration of said input pulses.

3. The circuitry of claim 2 wherein:
   said sampling means including,
   a gate circuit for sensing the trailing edge of each of said input pulses and providing said sampling pulses in response thereto.

4. The circuitry of claim 3 wherein:
   said gate circuit including,
   a time constant circuit for receiving said input pulses and having a time constant slightly longer compared to the time duration of said input pulses, and
   a monostable multivibrator responsive to said time constant circuit to be triggered to its unstable state and provide said sampling pulses at the trailing edge of each of said input pulses.

5. The circuitry of claim 3 wherein:
   said bilateral switching means comprising,
   a pair of transistors each including a plurality of electrodes, a first and second of said electrodes of each of said transistors, respectively, commonly connected, a third of said electrodes of each of said transistors operatively connected, respectively, to said stretching means and said holding means,
   said first and second electrodes of said transistors operatively connected to said sampling means, with said pair of transistors being responsive to said sampling signals to provide a low impedance bilateral conductive path therethrough between said stretching means and said holding means.

6. The circuitry of claim 5 wherein:
   said sampling means including,
   a transformer having a primary winding responsive to said sampling signals and a secondary winding connected across the common connection of said first and second electrodes of each of said transistors, with sufficient current being supplied from said secondary winding to drive each of said pairs of transistors into saturation in response to said sampling signals.

7. The circuitry of claim 6 wherein:
   said holding circuit comprising, an RC circuit having a long time constant compared to the time duration between each of said input pulses.

8. The circuitry of claim 7 wherein:
   said stretching means further including
   an emitter follower transistor stage responsive to the stretched input pulses and providing a high shunt impedance to said peak detector circuit, while providing a low impedance to the charging path including said bilaterial switching means for said holding circuit.

9. The circuitry of claim 7 wherein:
   said input pulses appear in trains, each of the trains including a plurality of input pulses, and wherein:
   said holding circuit having a relatively long time constant compared to the time period between said trains so that the last input pulse of each of said trains is stored for a relatively long time.

10. The circuit of claim 5 wherein said input pulses are amplitude modulated and wherein:
   said holding circuit having a time constant relatively long compared to the time duration between each of said input pulses so that the modulation envelope is reconstructed thereby.

References Cited

UNITED STATES PATENTS

| | | | |
|---|---|---|---|
| 3,286,101 | 11/1966 | Simon | 328—151 X |
| 3,384,838 | 5/1968 | Knutrud | 307—265 X |
| 3,386,079 | 5/1968 | Wiggins. | |

ALFRED L. BRODY, Primary Examiner

U.S. Cl. X.R.

307—246, 265; 325—322; 328—58, 115, 151; 329—104